(12) United States Patent
Ross et al.

(10) Patent No.: US 10,019,784 B2
(45) Date of Patent: Jul. 10, 2018

(54) MEDICAL IMAGE PROCESSING APPARATUS AND METHOD

(71) Applicant: Toshiba Medical Systems Corporation, Otawara-shi (JP)

(72) Inventors: Paul Spencer Ross, Edinburgh (GB); Timothy Day, Edinburgh (GB); Robert Davey, Edinburgh (GB)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 14/661,456

(22) Filed: Mar. 18, 2015

(65) Prior Publication Data

US 2016/0275653 A1     Sep. 22, 2016

(51) Int. Cl.
*G06T 5/00* (2006.01)
*G06T 15/80* (2011.01)
*G06T 15/08* (2011.01)

(52) U.S. Cl.
CPC .............. *G06T 5/002* (2013.01); *G06T 15/08* (2013.01); *G06T 2200/04* (2013.01); *G06T 2207/10136* (2013.01); *G06T 2207/20192* (2013.01); *G06T 2207/30044* (2013.01)

(58) Field of Classification Search
CPC ................................... G09B 23/286
USPC ................................. 345/419, 424
See application file for complete search history.

(56) References Cited

U.S. PATENT DOCUMENTS

| | | | |
|---|---|---|---|
| 6,246,784 B1 * | 6/2001 | Summers | G06K 9/00201 382/128 |
| 6,535,623 B1 * | 3/2003 | Tannenbaum | G06T 7/64 382/128 |
| 6,721,450 B2 * | 4/2004 | Tannenbaum | G06T 7/64 382/173 |
| 7,315,640 B1 * | 1/2008 | Brady | G06T 5/002 382/128 |
| 7,439,974 B2 * | 10/2008 | Chihoub | G06T 15/08 345/422 |

(Continued)

OTHER PUBLICATIONS

Dolores H. Pretorius et al., "Preexamination and Postexamination Assessment of Parental-Fetal Bonding in Patients Undergoing 3-/4-Dimensional Obstetric Ultrasonography", J. Ultrasound Med., Nov. 1, 2006, vol. 25, pp. 1411-1421.

(Continued)

*Primary Examiner* — Kimbinh T Nguyen
(74) *Attorney, Agent, or Firm* — Oblon, McClelland, Maier & Neustadt, L.L.P.

(57) ABSTRACT

A medical image processing apparatus comprises smoothing circuitry that receives a volumetric medical image data set corresponding to a 3D region of a subject and smooths the volumetric medical image data set to generate a smoothed medical image data set, wherein at least one part of the surface of a structure is represented in the volumetric medical image data set, rendering circuitry that produces a 2D rendered data set from the smoothed medical image data set, curvature calculation circuitry that calculates a respective curvature at each of a plurality of positions on the at least one part of the surface of the structure and smooths the calculated curvatures to obtain smoothed calculated curvatures, and shading addition circuitry that adds shading to the 2D rendered data set in dependence on the smoothed calculated curvatures.

16 Claims, 3 Drawing Sheets

(56) References Cited

U.S. PATENT DOCUMENTS

| | | | | |
|---|---|---|---|---|
| 7,819,806 | B2 * | 10/2010 | Yang | A61B 5/1075 600/437 |
| 7,912,264 | B2 * | 3/2011 | Freiburger | A61B 8/06 382/128 |
| 2008/0030500 | A1 * | 2/2008 | Krishnan | G06T 15/08 345/424 |
| 2008/0260227 | A1 * | 10/2008 | Hayashi | A61B 8/06 382/131 |
| 2013/0116561 | A1 * | 5/2013 | Rothberg | A61B 8/4254 600/438 |
| 2013/0271455 | A1 * | 10/2013 | Tsujita | A61B 8/0866 345/419 |
| 2014/0219062 | A1 * | 8/2014 | Rothberg | B81B 3/0021 367/135 |
| 2015/0173715 | A1 * | 6/2015 | Raghavan | A61B 8/46 600/440 |
| 2016/0063758 | A1 * | 3/2016 | Schroecker | G06T 15/80 345/426 |

OTHER PUBLICATIONS

Markus Hadwiger et al., "Real-time Ray-Casting and Advanced Shading of Discrete Isosurfaces", Eurographics 2005, vol. 24, No. 3, 2005, 10 pages.

Gordon Kindlmann et al., "Curvature-based Transfer Functions for Direct vol. Rendering: Methods and Applications", VIS '03 Proceedings of the 14th IEEE Visualization 2003, 8 pages.

C.Tomasi et al.,"Bilateral Filtering for Gray and Color Images", Proceedings of the 1998 IEEE International Conference on Computer Vision, 1988, 8 pages.

Pietro Perona et al., "Scale-Space and Edge Detection Using Anisotropic Diffusion", IEEE Transactions on Pattern Analysis and Machine Intelligence, vol. 12, No. 7, Jul. 1990,11 pages.

Zahid Hossain et al., "Edge Aware Anisotropic Diffusion for 3D Scalar Data", IEEE Transactions on Visualization and Computer Graphics, Issue No. 6, vol. 16, Nov./Dec. /2010, 12 pages.

* cited by examiner

MEDICAL IMAGE PROCESSING APPARATUS AND METHOD

FIELD

Embodiments described herein relate generally to a method of, and apparatus for, medical image processing using curvature-based shading, for example ultrasound image processing using curvature-based shading.

BACKGROUND

It is known to use ultrasound to image a fetus in the womb by transmission and reception of ultrasound waves from a transducer.

Three-dimensional (3D) ultrasound images may be obtained by using software to combine ultrasound data that has been taken at different positions or angles, and to render an image from the combined data using methods such as simple surface shading or direct volume rendering. In four-dimensional (4D) ultrasound imaging systems, a series of three-dimensional images obtained at different times is dynamically rendered to produce a moving 3D image, for example a 3D ultrasound movie.

In recent years, 3D and 4D ultrasound images have been made more realistic through the use of advanced lighting techniques (referred to as global illumination, gradient free lighting, subsurface scattering or photon mapping) that simulate illumination with a more physically accurate model than was previously used.

A popular objective of 3D and 4D fetal ultrasound scans (sometimes known as fetal keepsake scans) is to image the fetal face. Many parents are having 3D or 4D ultrasound scans in order to bond better with their unborn child, motivated by the realistic appearance of the scans. 3D or 4D ultrasound scans can also be useful for informing parents of the appearance of a fetus that has an abnormality such as a cleft lip or cleft palate.

Volumetric data received from ultrasound scans may be noisy. Volumetric ultrasound data may be smoothed before rendering to reduce noise in the resulting rendered image. However, the process of smoothing the volumetric image data may also reduce levels of detail in the rendered image.

BRIEF DESCRIPTION OF THE DRAWINGS

Embodiments are now described, by way of non-limiting example, and are illustrated in the following figures, in which:

FIGS. 3a and 3b are images rendered from smoothed volumetric image data, the method of an embodiment having been applied to FIG. 3b and not to FIG. 3a.

DETAILED DESCRIPTION

Certain embodiments provide a medical image processing apparatus comprising smoothing circuitry that receives a volumetric medical image data set corresponding to a 3D region of a subject and smooths the volumetric medical image data set to generate a smoothed medical image data set, wherein at least one part of the surface of a structure is represented in the volumetric medical image data set and in the smoothed medical image data set, rendering circuitry that produces a 2D rendered data set from the smoothed medical image data set, curvature calculation circuitry that calculates a respective curvature at each of a plurality of positions on the at least one part of the surface of the structure and smooths the calculated curvatures to obtain smoothed calculated curvatures, and shading addition circuitry that adds shading to the 2D rendered data set in dependence on the smoothed calculated curvatures.

Certain embodiments provide a medical imaging method comprising receiving a volumetric medical image data set corresponding to a 3D region of a subject, smoothing the volumetric medical image data set to generate a smoothed medical image data set, wherein at least one part of the surface of a structure is represented in the volumetric medical image data set and in the smoothed medical image data set, producing a 2D rendered data set from the smoothed medical image data set, calculating a respective curvature at each of a plurality of positions on the at least one part of the surface of the structure, smoothing the calculated curvatures to obtain smoothed calculated curvatures, and adding shading to the 2D rendered data set in dependence on the smoothed calculated curvatures.

Figure 1:
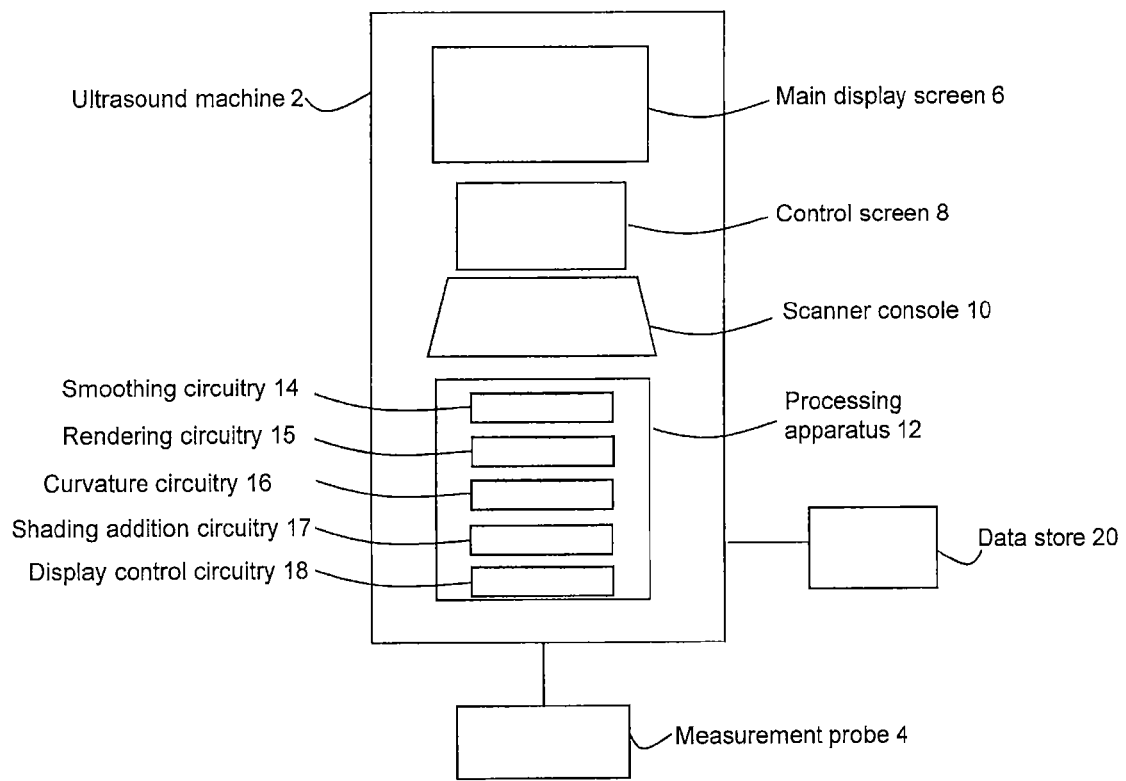
FIG. 1 is a schematic diagram of an image processing apparatus according to an embodiment.

An image processing apparatus according to an embodiment is illustrated schematically in FIG. 1. The apparatus comprises an ultrasound machine 2 and an associated measurement probe 4. Any suitable type of ultrasound machine 2 and measurement probe 4 may be used, for example any ultrasound machine 2 and transducer probe 4 that are configured to obtain fetal ultrasound image data that is suitable for 3D or 4D imaging.

The ultrasound machine 2 comprises a main display screen 6 for displaying a main ultrasound image, a control screen 8 for displaying control information, and a scanner console 10. In this embodiment, the scanner console 10 comprises an input device or devices such as input buttons or knobs, a computer keyboard, a mouse or a trackball. In alternative embodiments, the control screen 8 is a touch screen, which is both a display device and a user input device. Further embodiments may comprise a control screen 8, display screen or main display screen 6 that does not form part of the ultrasound machine 2.

The ultrasound machine 2 comprises a processing apparatus 12 for processing of data, including image data. In the present embodiment, the processing apparatus 12 is configured to process ultrasound data. In other embodiments, any modality of data may be processed, for example CT, MR, PET or SPECT data.

The processing apparatus 12 includes smoothing circuitry 14, rendering circuitry 15, curvature circuitry 16, shading addition circuitry 17 and display control circuitry 18.

In the present embodiment, the smoothing circuitry 14, rendering circuitry 15, curvature circuitry 16, shading addition circuitry 17 and display control circuitry 18 are each implemented in processing apparatus 12 by means of a computer program having computer-readable instructions that are executable to perform the method of the embodiment. However, in other embodiments the various circuitry may be implemented in software, hardware or any suitable combination of hardware and software. In some embodiments, the various circuitry may be implemented as one or more ASICs (application specific integrated circuits) or FPGAs (field programmable gate arrays).

The processing apparatus 12 also includes a hard drive and other components including RAM, ROM, a data bus, an operating system including various device drivers, and hardware devices including a graphics card. Such components are not shown in FIG. 1 for clarity. In an alternative embodiment, the processing apparatus 12 is not part of the ultrasound machine 2 and may be, for example, a personal computer or workstation.

Although in the present embodiment the image processing apparatus comprises an ultrasound machine 2, in other embodiments the image processing apparatus may comprise a scanner of an alternative modality (for example, CT, MR, PET or SPECT), an apparatus for processing medical image data (for example, a PCT or workstation), or a combination of a scanner and a processing apparatus.

Figure 2:
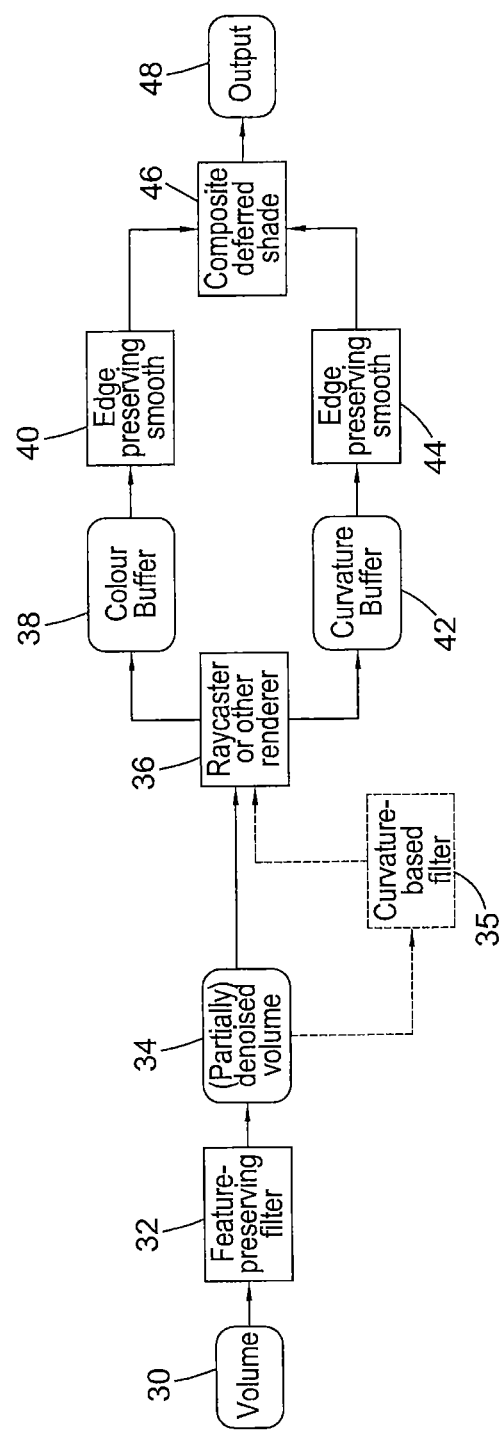
FIG. 2 is a flowchart illustrating in overview a mode of operation according to an embodiment.

The system of FIG. 1 is configured to perform a process having a series of stages as illustrated in overview in the flow chart of FIG. 2.

The smoothing circuitry 14 receives an image volume 30. The image volume 30 comprises volumetric medical image data, and may be referred to as a volumetric medical image data set. The image volume 30 corresponds to a 3D region of a subject, and is representative of at least part of the surface of a structure.

The image volume 30 may be considered to comprise unsmoothed ultrasound data. The image volume 30 may be initially available data, for example data resulting from an ultrasound scan acquisition phase. In some circumstances, initially available data may have a degree of smoothing performed in the acquisition phase.

In the present embodiment, the image volume 30 comprises volumetric image data resulting from an ultrasound scan of a patient that has been taken using ultrasound machine 2 and probe 4. The region of the patient that is scanned is the patient's womb, and the image is representative of at least part of the surface of a fetus, in particular the fetal face.

Although in the present embodiment the volumetric medical image data comprises ultrasound data, the volumetric image data may have been obtained using any suitable medical imaging apparatus and may comprise, for example, CT, MR, PET or SPECT data.

In embodiments, the image volume 30 may be representative of any 3D region of a patient, for example, the head, chest or abdomen of a patient. The image volume 30 may represent any appropriate anatomical structure that may be imaged. For example, in one embodiment the 3D region is the chest of a patient and the structure to be imaged is the heart.

The image volume 30 comprises a plurality of voxels, each voxel having an associated position in the three-dimensional space of the image volume 30 and an associated intensity.

At stage 32, the smoothing circuitry 14 applies a feature-preserving filter to the image volume 30 to produce a partially denoised image volume 34. A feature-preserving filter may be a filter that preserves high intensity gradients. In the present embodiment, the feature-preserving filter is a bilateral filter (see, for example, Tomasi and Manduchi, Bilateral Filtering for Gray and Color Images, Proceedings of the 1998 IEEE International Conference on Computer Vision, Bombay, India). In other embodiments, the feature-preserving filter is a standard anisotropic diffusion (Perona Malik) filter (see, for example, Perona and Malik, Scale-Space and Edge Detection Using Anisotropic Diffusion, IEEE Transactions on Pattern Analysis and Machine Intelligence, Vol 12, No 7, July 1990).

In some alternative embodiments, an isotropic and symmetric filter (for example, a Gaussian filter) may be used instead of a feature-preserving filter at stage 32.

The bilateral filter as used in the present embodiment may be considered to be a special case of general anisotropic diffusion, although it may be applied in a different way (usually with one iteration and a large kernel radius). The bilateral filter may act like a standard Gaussian filter whose kernel coefficients are modulated by a separate Gaussian function of intensity values (known as the range component). Perona Malik anisotropic diffusion performs smoothing based on a function of gradient. In Perona Malik anisotropic diffusion, areas of high gradient (edges) have less smoothing applied than areas of lower gradient.

The bilateral filter smooths the volumetric image data by replacing the intensity value of each voxel with a function of the intensity values of nearby voxels, the function taking into account both the position of each nearby voxel and the degree of similarity between each nearby voxel's intensity value and the intensity value of the voxel under consideration.

In the present embodiment, the smoothing circuitry 14 passes the partially denoised image volume 34 to rendering circuitry 15 for use in stage 36. In alternative embodiments, the smoothing circuitry 14 performs an additional smoothing stage 35 on the partially denoised image volume 34. In one such embodiment (shown as a dotted lines in FIG. 2), an additional stage 35 is added between stage 34 and stage 36.

At stage 35, a curvature-based smoothing filter is applied to the partially denoised image volume 34. The curvature-based smoothing filter is a feature-preserving smoothing filter. The curvature-based smoothing filter smooths regions of the image data while preserving region boundaries.

In the present embodiment, the curvature-based smoothing filter is a Hossain Möller filter (see, for example, Hossain and Möller, Edge Aware Anisotropic Diffusion for 3D Scalar Data, IEEE Transactions on Visualization and Computer Graphics, Issue No 6, November/December (2010 vol. 16) pp. 1376-1385).

The Hossain Möller filter may be described by a nonlinear-diffusion partial differential equation which performs different degrees of smoothing in three orthogonal directions defined by a set of basis vectors (both principal curvature direction vectors and a normal vector). The actual principal curvature directions (eigenvectors of the shape operator) may not be required to be explicitly computed. Only the associated scalar eigenvalues may be used in some cases.

The curvature-based smoothing filter generates an updated partially denoised image volume. The smoothing circuitry 14 passes the updated partially denoised image volume to the rendering circuitry 15 for use in stage 36. In other embodiments, a different smoothing filter may be used at stage 35 instead of or in addition to the curvature-based smoothing filter. For example, any suitable feature-preserving filter may be used at stage 35. In some embodiments, the curvature-based smoothing filter of stage 35 may be a Level Set Method (LSM) smoothing filter. The filter of stage 35 may be referred to as a secondary filter.

When the secondary filter of stage 35 is enabled in addition to the initial feature-preserving filter of stage 32, the secondary filter of stage 35 may provide most of the feature-preserving smoothing of the input data and the initial feature-preserving filter of stage 32 may provide a smaller contribution to the smoothing. The initial feature-preserving filter of stage 32 may act to provide a smoother set of initial conditions to the curvature-based smoothing filter of stage 35. The curvature-based smoothing filter of stage 35 may require relatively smooth dataset curvatures for stability and efficiency. The curvature-based smoothing filter may be more stable and efficient when provided with data that has been smoothed by the initial feature-preserving filter of stage 32 than if it was provided with image volume 30 directly.

At stage 36, the rendering circuitry 15 receives the partially denoised image volume 34, or, in the embodiment in which stage 35 is performed, receives the updated partially denoised image volume. The partially denoised image volume 34 or updated partially denoised image volume may be referred to as a smoothed medical image data set.

The rendering circuitry 15 performs a raycasting process on the smoothed medical image data set as described below.

As a first stage in the raycasting process of stage 36, the rendering circuitry 15 defines a two-dimensional array of pixels. The array of pixels is of a size that is suitable to form an image for display on main display screen 6.

As a second stage in the raycasting process of stage 36, the rendering circuitry 15 defines a camera position relative to the 3D volume represented by the smoothed medical image data set. The camera position is outside the boundary of the volume represented by the smoothed medical image data set.

As a third stage in the raycasting process of stage 36, the rendering circuitry 15 casts rays from the camera position into the volume represented by the smoothed medical image data set. One ray is cast for each pixel in the array of pixels. The direction of the ray is dependent on the camera position and on the position of the pixel in the array of the pixels.

On entering the volume represented by the smoothed medical image data set, the ray samples the volume represented by the smoothed medical image data set at a number of sampling points. Each sampling point may or may not coincide with the position of a voxel of the smoothed medical image data set. If the sampling point coincides with the position of a voxel, the ray determines the intensity value at that voxel. If the sampling point does not coincide with the position, the ray determines an intensity value at the sampling point by interpolating an intensity value from the intensity values of neighboring voxels.

When the ray reaches a sampling point whose intensity value indicates that the ray has reached the surface of the imaged structure, the ray terminates and the rendering circuitry 15 records the position and intensity value of that sampling point (which may be called the ray termination point).

The positions of the ray termination points may be considered to form an isosurface representative of the surface of the imaged structure. In the present embodiment, the surface of the imaged structure comprises the fetal face.

As a fourth stage in the raycasting process of stage 36, the rendering circuitry 15 uses the positions and intensity values of the recorded ray termination points to render a 2D rendered data set. The 2D rendered data set is rendered by assigning a color value to each pixel. The color value may comprise, for example, an RGB or HSL color value.

In the present embodiment, the rendering comprises Global Illumination rendering, in which advanced lighting techniques are used to simulate illumination from one or more lighting positions.

For each ray, the curvature circuitry 16 calculates a curvature value at the ray termination point. In the present embodiment, the curvature circuitry 16 calculates the curvature values based on the smoothed medical image data set. In other embodiments, the curvature circuitry calculates the curvature values based on the volumetric medical image data set, or based on a combination of the volumetric medical image data set and the smoothed medical image data set.

The ray termination point may be described as being a point of intersection with an isosurface that represents the imaged structure. The curvature may represent the change of the normal vector, for example the change of the normal vector in three dimensions. For each ray termination point, the region (for example the region of the smoothed medical image data set) around the ray termination point may be sampled to obtain a gradient and second derivative (for example, Hessian) of the isosurface at that point. The gradient and second derivative may then be used to derive the curvature at that point.

In general, curvature at a point can comprise curvature in two principal planes, each of which is perpendicular to the gradient of the surface at that point. The two principal planes are orthogonal to each other.

In the present embodiment, the curvature circuitry 16 calculates the minimum principal curvature at the ray termination point. The curvature circuitry 14 calculates curvature in each of the principal planes, and selects the more negative curvature value. The process aims to find valleys or creases in the surface (regions of high negative curvature).

In other embodiments, maximum principal curvature is used instead of or in addition to minimum principal curvature. Using the maximum principal curvature aims to find ridges in the surface (regions of high positive curvature).

In further embodiments, any appropriate curvature value may be determined for each ray termination point, for example, mean curvature or Gaussian curvature.

In the present embodiment, the curvature circuitry 16 determines the curvature at a single position for each ray. The curvature circuitry 16 determines the curvature of the first surface that the ray hits (at the ray termination point). In other embodiments curvature may be calculated at multiple points along the ray. For example, curvature may be calculated for every sample point. The curvature values may be integrated along the ray. Curvature values may be used to modulate the color at each sample point along the ray and the modulated colors may be integrated along the ray.

In the present embodiment, the curvature circuitry 16 calculates the curvature of each ray termination point at the same stage as the rendering circuitry 15 determines the color value for each ray termination point. In other embodiments, the curvature may be calculated at a different stage in the process. In some embodiments, the rendering circuitry 15 and curvature circuitry 16 are combined into one circuitry.

In the present embodiment, positions at the surface of the structure are determined as part of the raycasting process by using the intensity values to determine where each ray terminates. In other embodiments, an isosurface representative of the surface of the structure is determined using any appropriate method before stage 36 is performed. In such embodiments, the raycasting process of stage 36 may determine the positions on the surface of the structure by determining where each ray intersects with the previously-determined isosurface.

At stage 38, the rendering circuitry 15 stores the 2D rendered data set (which comprises a plurality of pixels, each with an associated position and color) in a 2D buffer. At stage 40, the rendering circuitry 15 applies an edge-preserving smoothing filter to the 2D rendered data set that is stored in the 2D buffer. In the present embodiment, the edge-preserving smoothing filter performs anisotropic diffusion smoothing. In other embodiments, any suitable edge-preserving smoothing filter may be used. In other embodiments, stage 40 is omitted (no smoothing is performed on the two-dimensional image data set).

At stage 42, the curvature circuitry 16 stores the 2D curvature data set in a 2D curvature buffer.

The 2D curvature data may comprise floating point data of a curvature metric. In the present embodiment, the curvature metric is the minimum principal curvature (the more negative of the two orthogonal principal curvature metrics). In the present embodiment, the values for the curvature metric are mostly negative but may be positive at certain places. The minimum principal curvature metric may be used for the purpose of valley enhancement.

In alternative embodiments, the curvature metric is a different metric, for example Gaussian curvature. The 2D curvature buffer stores the raw curvature metric data (as determined by curvature circuitry 16 at stage 36) in floating point form. The raw curvature metric data may be optionally smoothed at stage 44.

At stage 44, an edge-preserving smoothing filter is applied to the curvature data. In the present embodiment, the edge-preserving smoothing filter applied to the curvature data comprises anisotropic diffusion. Anisotropic diffusion may preserve the edges in the curvature data. In other embodiments, any edge-preserving smoothing method may be used.

In some embodiments, after the edge-preserving smoothing filter of stage 44 is applied to the set of curvature data in the 2D curvature buffer, a further smoothing process (not shown) is applied to the curvature data that has been smoothed at stage 44. For example, in one embodiment, a Gaussian smoothing process is used after stage 44 to refine any rough, sharp or pixelated edges that are produced by the anisotropic diffusion of stage 44.

In this description of the present embodiment, stages 42 and 44 of the process of FIG. 2 are described after stages 38 and 40. However, in embodiments, stages 42 and 44 may occur after stages 38 and 40, at the same time as stages 38 and 40, or before stages 38 and 40. Stages 38, 40, 42 and 44 may occur at the same time as parts of stage 36.

At stage 46, the shading addition circuitry 17 creates a final 2D data set by compositing the 2D rendered data set (which in this embodiment has undergone smoothing) and the 2D curvature data set (which has also undergone smoothing). Stage 46 may be referred to as a deferred shading stage.

For each pixel, the shading addition circuitry 17 modulates the color value for that pixel from the smoothed 2D rendered data set by the curvature value for that pixel from the smoothed 2D curvature data set. In the present embodiment, the color is modulated so that each RGB channel is modulated by the same proportion (in this embodiment, the same percentage).

The value for each RBG channel may be reduced or increased depending on whether the curvature metric at a particular point has a negative or a positive value. In valley regions, the curvature metric will be negative, resulting in a reduction in each of the RGB values.

$$R_{out} = R_{in} + c*m*R_{in}$$

$$G_{out} = G_{in} + c*m*G_{in}$$

$$B_{out} = B_{in} + c*m*B_{in}$$

where $R_{in}$, $G_{in}$ and $B_{in}$ are the color values from the smoothed 2D rendered data set, c is the curvature metric value from the smoothed 2D curvature data set, m is a constant multiplication factor, and $R_{out}$, $G_{out}$ and $B_{out}$ are the modified color values resulting from stage 46.

In alternative embodiments, the multiplication value m may be channel-dependent. In further embodiments, color modulation may be computed in a different color space (for example, HSV or HSL.) In some embodiments, the shading addition circuitry 17 may use the curvature value for a given pixel in the smoothed 2D curvature data set to look up a transfer function texture directly for the final color. In other embodiments, the shading addition circuitry 17 may reference a color table for direct color or to set channel-dependent weights in the compositing operation described above.

The display control circuitry 18 displays the final 2D data set on main display screen 6. In an alternative embodiment, a final smoothing is performed on the final 2D data set before it is displayed.

In the present embodiment, the 2D curvature data is stored in the curvature buffer as small floating point values, both positive and negative, for a given curvature metric (in the present embodiment, minimum principal curvature). In other embodiments, any suitable method of storing the curvature data may be used. As in the above embodiment, the curvature data composited with the 2D rendered data set may be smoothed curvature data.

In the above embodiment the 2D rendered data set comprises a color value for each pixel. In some embodiment, the color value may be a greyscale value, for example if the final 2D data set is to be displayed in black and white. The color value may be a sepia tone for a conventional 3D ultrasound display.

Figure 3A:
Figure 3B:

FIGS. 3a and 3b illustrate the effect of applying the method of FIG. 3 to global illumination 'baby face' rendering. Image 3a is a line-drawn representation of an image generated using global illumination rendering with a high degree of volume smoothing. Image 3b is a line-drawing representation of a further image generated using the same smoothing and rendering stages as those used to generate the image depicted in FIG. 3a, but with the addition of the method of FIG. 2.

Obtaining a good balance between detail and smoothing may be important, especially for realistic rendering methods such as global illumination.

By using the curvature data to modulate shading, areas of high negative curvature such as facial creases may be shaded with greater intensity than when global illumination rendering is performed without the use of the process of FIG. 2. In the present embodiment, the deferred shading of stage 46 uses minimum principal curvature values. Large negative values for minimum principal curvature highlight valley regions. Positive values for minimum principal curvature also provide a subtle shading effect which provides a contrast between higher regions and valleys. Optionally, strictly negative minimum principal curvature values may be specified, which may result in a flatter effect. In alternative embodiments, maximum principal curvature values may be used. The use of maximum principal curvature may highlight ridge regions.

By compositing curvature values with color values, an effect may be achieved that is akin to outlining the high curvature areas. Regions with high negative curvature may be shaded towards black.

In the present embodiment there is no explicit mapping stage assigning colors to curvature values. In other embodiments, colors may be explicitly mapped to curvature values, for example by using color tables. Curvature multiplication constants are used to modulate RBG channels. Regions of high negative curvature will be shaded towards black if the curvature modulation constants for each RBG color channel are identical.

Deferring the curvature-based shading until after the rendering process of stage 36 may improve performance.

For example, deferring the curvature-based shading until after the rendering process may require reduced computational resources when compared with applying the shading at the time of rendering, for example by applying shading to a two-dimensional data set rather than to a three-dimensional volume.

Deferring the curvature-based shading until after the rendering process allows smoothing of the curvature data prior to shading. Smoothing the curvature data may reduce or remove artifacts that may be produced as a result of shading residual noise from the volume smoothing stage (for example, stage 34). Deferred curvature-based shading may be applicable to data sets where a single isosurface is displayed (for example, ultrasound).

By using a deferred shading based on curvature data, it may be possible to enhance detail in certain areas of the output image (for example, facial features) that may have been lost after the initial smoothing stage (for example, at stage 34). In general, enhancing detail may present difficulties if noise is also enhanced. Ultrasound data may be particularly noisy when compared to other medical imaging modalities. In some circumstances, the method of the embodiments described above may enhance detail by shading whilst minimizing noise-derived shading artifacts.

As curvature-shading on its own may enhance noise, the initial volume smoothing stage may be used in combination with curvature-shading in order to achieve a balance between detail and noise. The image volume may be initially smoothed using a feature-preserving filter, or a combination of feature-preserving filters. In some embodiments, the initial volume smoothing comprises a combination of feature-preserving filtering (stage 34) and curvature-based smoothing. In other embodiments, alternative smoothing methods may be used in the initial smoothing stage. The curvature measure used in an initial curvature-based smoothing may be an additional computation to the computation of curvature that is carried out in stage 36 and has its results stored at stage 42.

In some embodiments, the method of FIG. 2 may be performed in real time or near real time as image volumes are captured. In some embodiments, a user may select whether to add shading to images before display. In some embodiments, a user may select how much shading to add to images before display.

In other embodiments, which may be described as offline embodiments, the method of FIG. 2 may be performed on stored data. For example, a user may use the process of FIG. 2 to manipulate stored volume data to achieve a desired result.

The use of deferred shading to emphasize features using curvature may produce an aesthetically pleasing result. Producing aesthetically pleasing results may be particularly relevant in fetal imaging. Although the embodiment described with reference to FIG. 2 describes imaging of the fetal face, the method of FIG. 2 may also be performed on other parts of the fetus, for example feet or hands. For example, the use of deferred shading when rendering a fetal hand may allow fingers to be better distinguished.

In some embodiments, the use of deferred shading may produce images that are easier to interpret than corresponding images that are rendered without deferred shading. For example, in one embodiment, deferred shading is used to emphasize features of the heart, for example the structure of a heart valve. Deferred shading may be used to bring back detail that has been lost by initial smoothing.

Certain embodiments provide a medical imaging method for the enhancement of detail using curvature measure whilst minimizing noise-derived artifacts, the method comprising an initial feature-preserving volume smoothing; curvature computation in a renderer on ray termination, the curvature data being stored in a buffer for later smoothing; smoothing of the curvature data prior to shading to minimize noise-derived shading artifacts; and a deferred shading stage (post-rendering) using the smoothed curvature data.

Certain embodiments provide a medical imaging method including a curvature calculation stage which calculates the curvature of multiple positions of the surface of a structure included in a first medical image corresponding to a 3D region of a subject, a smoothing stage which generates a second medical image by smoothing in accordance with said curvature at least one part of the surface of the structure included in said first medical image, and a shading stage, which adds shading to said second medical image corresponding to said included surface of the structure.

Said multiple positions may be incident points of a plurality of rays on said surface of the structure, based on a starting point set on the circumference of said structure included in said first medical image. The curvature calculation stage may comprise implementing the calculation of said curvature by taking, as the target image, said first medical image wherein at least said structure surface has already been smoothed by a predetermined smoothing process. Said structure may include at least one part of the fetal head of said subject. The method may further comprise a display control stage which causes the display of said shaded second medical image resulting from said shading stage on a prescribed display screen.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:
1. A medical image processing apparatus, comprising:
smoothing circuitry that receives a volumetric medical image data set corresponding to a 3D volumetric region of a subject and filters the volumetric medical image data set by using a feature-preserving smoothing filter to generate a partially denoised image volume, and filters the partially denoised image volume by using a curvature-based smoothing filter to generate a smoothed volumetric medical image data set, the feature-preserving smoothing filter preserving high intensity gradients, the curvature-based smoothing filter smoothing regions of the partially denoised image volume while preserving region boundaries, wherein at least one part of a surface of a structure is represented within the volumetric medical image data set and within the smoothed volumetric medical image data set;
rendering circuitry that produces a 2D rendered data set from the smoothed medical image data set and smooths the 2D rendered data set by using a first edge-preserving smoothing filter to generate a smoothed 2D rendered data set, wherein the first edge-preserving smoothing filter performs anisotropic diffusion smoothing;

curvature calculation circuitry that calculates a respective curvature at each of a plurality of positions on the at least one part of the surface of the structure and smooths the calculated curvatures by using a second edge-preserving smoothing filter to obtain smoothed calculated curvatures, wherein the calculating of the curvature is based on at least one of the volumetric medical image data set and the smoothed volumetric medical image data set, the second edge-preserving smoothing filter performs anisotropic diffusion smoothing, and each curvature that is calculated by the curvature calculation circuitry comprises at least one of a minimum principal curvature, a maximum principal curvature, a mean curvature, and a Gaussian curvature; and shading addition circuitry that composites the smoothed 2D rendered data set and the smoothed calculated curvatures.

2. The medical image processing apparatus according to claim 1, wherein the plurality of positions comprises incident points of a plurality of rays on the surface of the structure.

3. The medical image processing apparatus according to claim 1, wherein the structure comprises at least part of a fetal head, a fetal foot, or a fetal hand.

4. The medical image processing apparatus according to claim 1, wherein at least one of
the shading addition circuitry is configured to add shading to the 2D rendered image data set so as to emphasize facial features; and
the shading that is added to the 2D rendered image data set by the shading addition circuitry emphasizes at least one of a valley or a ridge on the surface of the structure.

5. The medical image processing apparatus according to claim 1, further comprising display control circuitry that causes display of the shaded 2D rendered data set on a display screen.

6. The medical image processing apparatus according to claim 1, wherein the curvatures that are calculated by the curvature calculation circuitry comprise curvatures of the surface in 3D.

7. The medical image processing apparatus according to claim 1, wherein the calculating of a respective curvature at each of the plurality of positions comprises calculating a change of a normal vector at each of the plurality of positions.

8. The medical image processing apparatus according to claim 1, wherein the calculated curvatures comprise minimum principal curvatures and the compositing of the smoothed 2D rendered data set and the smoothed calculated curvatures comprises adding shading to the 2D rendered data set in dependence on the minimum principal curvatures.

9. The medical image processing apparatus according to claim 1, wherein the calculated curvatures comprise maximum principal curvatures and the compositing of the smoothed 2D rendered data set and the smoothed calculated curvatures comprises adding shading to the 2D rendered data set in dependence on the maximum principal curvatures.

10. The medical image processing apparatus according to claim 1, wherein the filtering of the volumetric image data set by the smoothing circuitry in order to generate the smoothed volumetric medical image data set comprises filtering said at least one part of the surface of the structure.

11. The medical image processing apparatus according to claim 1, wherein the 2D rendered data set comprises a plurality of pixels, and the compositing of the smoothed 2D rendered data set and the smoothed calculated curvatures comprises, for each pixel, compositing the smoothed calculated curvature value for that pixel with at least one of a color value or greyscale value for that pixel.

12. The medical image processing apparatus according to claim 1, wherein the volumetric medical image data set comprises at least one of ultrasound data, CT data, MR data, PET data, and SPECT data.

13. The medical image processing apparatus of claim 1, wherein the structure is an anatomical structure and the apparatus further comprises processing circuitry configured to determine the surface of the structure represented within the volumetric medical image data set prior to the rendering circuitry producing the 2D rendered data set.

14. A medical diagnostic apparatus, comprising:
a scanner configured to generate a volumetric medical image data set corresponding to a 3D volumetric region of a subject;
a data store configured to store volumetric medical image data;
a display screen configured to display medical images;
smoothing circuitry configured to
receive the volumetric medical imaging data set,
filter the volumetric medical image data set by using a feature-preserving smoothing filter to generate a partially denoised image volume, and
filter the partially denoised image volume by using a curvature-based smoothing filter to generate a smoothed volumetric medical image data set, wherein
the feature-preserving smoothing filter preserving high intensity gradients, the curvature-based smoothing filter smoothing regions of the partially denoised image volume while preserving region boundaries, and at least one part of a surface of a structure is represented within the volumetric medical image data set and within the smoothed medical image data set;
rendering circuitry configured to
produce a 2D rendered data set from the smoothed medical image data set, and
smooth the 2D rendered data set by using a first edge-preserving smoothing filter to generate a smoothed 2D rendered data set, wherein
the first edge-preserving smoothing filter performs anisotropic diffusion smoothing;
curvature calculation circuitry configured to
calculate a respective curvature at each of a plurality of positions on the at least one part of the surface of the structure, and
smooth the calculated curvatures by using a second edge-preserving smoothing filter to obtain smoothed calculated curvatures, wherein
the calculating of the curvature is based on at least one of the volumetric medical image data set and the smoothed volumetric medical image data set, the second edge preserving smooth filter performs anisotropic diffusion smoothing, and each curvature that is calculated by the curvature calculation circuitry comprises at least one of a minimum principal curvature, a maximum principal curvature, a mean curvature, and a Gaussian curvature;
shading addition circuitry configured to composite the smoothed 2D rendered data set and the smoothed calculated curvatures; and display control circuitry configured to cause the display of the composited 2D rendered data set on the display screen.

15. A medical imaging method, comprising:
receiving, by processing circuitry, a volumetric medical image data set corresponding to a 3D volumetric region of a subject;
filtering, by processing circuitry, the volumetric medical image data set by using a feature-preserving smoothing filter to generate a partially denoised image volume, and filtering the partially denoised image volume by using a curvature-based smoothing filter to generate a smoothed volumetric medical image data set, the feature-preserving smoothing filter preserving high intensity gradients, the curvature-based smoothing filter smoothing regions of the partially denoised image volume while preserving region boundaries, wherein at least one part of a surface of a structure is represented within the volumetric medical image data set and within the smoothed medical image data set;
producing a 2D rendered data set from the smoothed medical image data set and smoothing the 2D rendered data set by using a first edge-preserving smoothing filter to generate a smoothed 2D rendered data set, wherein the first edge-preserving smoothing filter performs anisotropic diffusion smoothing;
calculating a respective curvature at each of a plurality of positions on the at least one part of the surface of the structure, wherein the calculating of the curvature is based on at least one of the volumetric medical image data set and the smoothed volumetric medical image data set, and each calculated curvature comprises at least one of a minimum principal curvature, a maximum principal curvature, a mean curvature, and a Gaussian curvature;
smoothing the calculated curvatures by using a second edge-preserving smoothing filter to obtain smoothed calculated curvatures, wherein the second edge preserving smooth filter performs anisotropic diffusion smoothing; and
compositing the smoothed 2D rendered data set and the smoothed calculated curvatures.

16. A non-transitory computer-readable storage medium storing a computer program comprising computer-readable instructions that are executable to perform a method comprising:
receiving a volumetric medical image data set corresponding to a 3D volumetric region of a subject;
filtering the volumetric medical image data set by using a feature-preserving smoothing filter to generate a partially denoised image volume, and filtering the partially denoised image volume by using a curvature-based smoothing filter to generate a smoothed volumetric medical image data set, the feature-preserving smoothing filter preserving high intensity gradients, the curvature-based smoothing filter smoothing regions of the partially denoised image volume while preserving region boundaries, wherein at least one part of a surface of a structure is represented in the volumetric medical image data set and in the smoothed volumetric medical image data set;
producing a 2D rendered data set from the smoothed medical image data set and smoothing the 2D rendered data set by using a first edge-preserving smoothing filter to generate a smoothed 2D rendered data set, wherein the first edge-preserving smoothing filter performs anisotropic diffusion smoothing;
calculating a respective curvature at each of a plurality of positions on the at least one part of the surface of the structure, wherein the calculating of the curvature is based on at least one of the volumetric medical image data set and the smoothed volumetric medical image data set, and each calculated curvature comprises at least one of a minimum principal curvature, a maximum principal curvature, a mean curvature, and a Gaussian curvature;
smoothing the calculated curvatures by using a second edge-preserving smoothing filter to obtain smoothed calculated curvatures, wherein the second edge preserving smooth filter performs anisotropic diffusion smoothing; and
compositing the smoothed 2D rendered data set and the smoothed calculated curvatures.

* * * * *